United States Patent
Turri et al.

(10) Patent No.: US 7,323,084 B2
(45) Date of Patent: Jan. 29, 2008

(54) METHODS FOR PAPER SIZING WITH FLUORINATED POLYMERS

(75) Inventors: Stefano Turri, Milan (IT); Tania Trombetta, Milan (IT); Paolo Iengo, Milan (IT)

(73) Assignee: Ausimont S.p.A., Milan (IT)

( * ) Notice: Subject to any disclaimer, the term of this patent is extended or adjusted under 35 U.S.C. 154(b) by 323 days.

(21) Appl. No.: 10/183,350

(22) Filed: Jun. 28, 2002

(65) Prior Publication Data

US 2003/0136533 A1 Jul. 24, 2003

(30) Foreign Application Priority Data

Jul. 5, 2001 (IT) .................... MI2001A1424

(51) Int. Cl.
  D21H 21/16 (2006.01)
  D21H 17/57 (2006.01)
  D21H 17/08 (2006.01)

(52) U.S. Cl. .................... 162/158; 162/135; 162/164.1

(58) Field of Classification Search .............. 162/135, 162/158, 164.6, 164.1, 168.1–168.3; 427/391, 427/361; 586/242–245; 524/504, 505
See application file for complete search history.

(56) References Cited

U.S. PATENT DOCUMENTS

| | | | |
|---|---|---|---|
| 3,242,218 A | | 3/1966 | Miller et al. |
| 3,311,527 A | * | 3/1967 | Urbanic et al. ............. 428/90 |
| 3,338,943 A | * | 8/1967 | Speier ..................... 556/418 |
| 3,351,643 A | * | 11/1967 | Hauptschein et al. ......... 554/39 |
| 3,372,978 A | * | 3/1968 | Whitfield et al. ............ 8/127.6 |
| 3,665,041 A | | 5/1972 | Sianesi et al. |
| 3,715,378 A | | 2/1973 | Sianesi et al. |
| 3,808,115 A | * | 4/1974 | Manion et al. ............. 204/165 |
| 3,810,874 A | | 5/1974 | Mitsch et al. |
| 4,523,039 A | | 6/1985 | Lagow et al. |
| 4,619,854 A | * | 10/1986 | Penttinen .................. 428/99 |
| 4,647,413 A | | 3/1987 | Savu |
| 5,149,842 A | | 9/1992 | Sianesi et al. |
| 5,156,780 A | * | 10/1992 | Kenigsberg et al. ......... 264/424 |
| 5,258,110 A | | 11/1993 | Sianesi et al. |
| 5,663,273 A | * | 9/1997 | Haniff et al. ............... 528/70 |
| 5,965,659 A | * | 10/1999 | Kubo et al. ................ 524/504 |
| 6,224,782 B1 | | 5/2001 | Allewaert et al. |
| 6,306,989 B1 | * | 10/2001 | Bloom et al. .............. 526/200 |
| 6,716,944 B2 | * | 4/2004 | Maekawa et al. ........... 526/245 |
| 2003/0136533 A1 | * | 7/2003 | Turri et al. ................ 162/158 |
| 2005/0004395 A1 | * | 1/2005 | Russo et al. ............... 562/586 |
| 2005/0267241 A1 | * | 12/2005 | Sugimoto et al. ........... 524/366 |

FOREIGN PATENT DOCUMENTS

| | | |
|---|---|---|
| DE | 4312854 A1 * | 10/1994 |
| EP | 0 148 482 | 7/1985 |
| EP | 0 239 123 | 9/1987 |
| EP | 0 273 449 A1 | 12/1987 |
| EP | 0 273 449 | 7/1988 |
| EP | 0 340 740 | 11/1989 |
| EP | 0 533 159 | 3/1993 |
| EP | 0 533 159 A1 | 3/1993 |
| EP | 0 689 908 | 1/1996 |
| EP | 0 689 908 A1 | 1/1996 |
| EP | 690039 A2 * | 1/1996 |
| EP | 0 841 432 A1 | 5/1998 |
| EP | 1 059 319 | 12/2000 |
| EP | 1 162 220 A1 | 12/2001 |
| EP | 1489124 A1 * | 12/2004 |
| GB | 1104482 | 2/1968 |
| WO | WO 90/03357 | 4/1990 |
| WO | WO 96/40811 | 12/1996 |
| WO | WO 97/08384 | 3/1997 |
| WO | WO 98/12241 | 3/1998 |
| WO | WO 99/67310 | 12/1999 |

OTHER PUBLICATIONS

Howells et al., "Sizing with fluorochemicals", presented to the 1997 TAPPI Sizing Short Course, Apr. 14-16, 1997.

Deisenroth, et al., "The designing of a new grease repellent fluorochemical for the paper industry", Surface Coatings International 1998 (9), pp. 440-447.

* cited by examiner

Primary Examiner—José A. Fortuna
(74) Attorney, Agent, or Firm—Arent Fox LLP

(57) ABSTRACT

Use for the paper sizing of aqueous polyurethane dispersions from (per)fluoropolyethers obtainable by reaction among the following compounds:

a) (per)fluoropolyether diols having a number average molecular weight from 400 to 5,000;

b) diisocyanates having formula:

(VIa)  OCN—R—NCO wherein R is an aliphatic, cycloaliphatic bifunctional radical; or an aromatic bifunctional radical;

c) diols containing one carboxylic function and optionally one or both the following components:

d) hydrazine and/or aliphatic diamines;

e) monofunctional hydroxylic (per)fluoropolyethers having a number average molecular weight in the range 300-1,000.

20 Claims, No Drawings

METHODS FOR PAPER SIZING WITH FLUORINATED POLYMERS

BACKGROUND OF THE INVENTION

The present invention relates to aqueous dispersions of polyurethanes having (per)fluoropolyether (PFPE) structures, and to their use for the paper sizing.

It is well known that paper is used for the packaging of fats, such as butter or margarine, of compounds such as coffee, chocolate, sugar, and also for the packaging of foods having a high fat content such meats, chips, hamburgers, popcorns, foods to be cooked in microwave oven, crisps for cats or dogs and in general pet food. For said uses it is necessary that the paper is treated with compounds capable to confer resistance to oils, fats and to water (oleo- and hydro-repellence). For these treatments fluorinated compounds (polymers or derivatives thereof having a lower molecular weight) are used.

The oleo-repellence is generally evaluated in terms of resistance of the paper sized to drops of hydrocarbons or mixtures of hydrocarbons having a progressively decreasing surface tension, maintained for 15 seconds in contact with the paper specimen (Kit Test, TAPPI 557 method). Usually as hydro-carbons, castor oil mixtures, toluene and heptane in various ratios are used. The oleo-repellence values obtained by the Kit Test are however an index of the only surface activity of the fluorinated additive, and often they have a poor correlation with the real performance in terms of protective barrier to oils and fats, both in normal utilization conditions of the paper packagings, for example in prolonged contact times with foods, and in severe pressure working conditions (calendering for the obtainment of paper manufactured articles), temperature (heating of the paper manufactured articles in microwave ovens) and mechanical stresses (for example bending to obtain the manufactured article). For this reason the paper users utilize a series of more indicative performanace tests of the practical behaviour in terms of resistance to fats and oils.

The most commonly used tests by the end-users ar the following:

Ralston Crease Test (RP-2 test): The resistance properties to the oil penetration in antigrease papers for pet-food packaging are evaluated. The percentage of the stained paper surface is determined by coloured oil. The acceptability limit of the specimen is 2% of stained surface.

Pet Food Test (crisp test): It is determined the resistance of the paper sized to the direct contact with the crisps used for dog and cat foods, which contain various fats of animal origin, and an amount of water generally not lower than 10% by weight. The combined action of fats, and in this case also of water, together with the mechanical action determined by the combination of the crisp weight and by their shape characterized by pronounced edges, acts so that the test is passed when the paper specimen has a high resistance both to fats and to water. The conditions of said test are more severe than the Ralston Crease Test for the presence of an environment having a high relative humidity and high applied pressure. The test result is expressed as percentage of surface stained with respect to the control. The specimen passes the test if the stained surface results lower than 5% of the surface. The sized paper specimen which passes this test has a high resistance both to greases and to water.

Resistance test to olive oil: The resistance to olive oil is evaluated at 105° C. for 24 hours. The test is passed if the paper is not stained (% of stained surface=0).

Resistance test to butter: The resistance to butter is evaluated in stove at 70° for 30 minutes. The test is passed when, this time elapsed, the paper, visually examined, does not show penetration of melted grease.

See the Examples for the detailed description of said tests.

Furthermore it is required that the compounds used for the paper sizing give also a certain resistance to water. In fact the pet food test and the butter resistance test require a combined effect of oleo- and hydro-repellence. The test used for the hydro-repellence is the Cobb Test (TAPPI T 441 method). It determines the increase by weight of a paper specimen after the water absorption under standard conditions. The water absorption is expressed as g of absorbed water/$m^2$ of paper. The lower the Cobb test value, the higher the resistance to water of the specimen.

In the field of non polymer fluorinated compounds used for the oleo-repellent paper sizing, phosphates and carboxylates having segments of linear or branched perfluoro-alkyl type, of the $CF_3$—$(CF_2)_{n0}$ — type, wherein n0 is an integer, are known. See for example the publication by R. D. Howells "Sizing with fluorochemicals" presented at "1997 TAPPI Sizing Short Course" 14-16 Apr., 1997. However said non polymer compounds do not give the paper sized high hydro-repellence, especially at high temperature.

Acrylic copolymers containing perfluoroalkyl segments ended with —$CF_3$ groups for the paper treatment are also known. See for example the above publication by R. D. Howells'. The fluorinated oligomeric and polymer structures containing perfluoroalkyl segments with —$CF_3$ type end groups are those considered in the prior art for the use in the paper treatment. See for example the publication "The designing of a new grease repellent fluorochemical for the paper industry", Surface Coatings International 1998 (9), pp. 440-447. The presence of —$CF_3$ groups is considered in the prior art essential to obtain the necessary resistance to oils and greases. However these compounds even though they show sufficient surface activity to obtain high Kit test values, not always pass the most severe above mentioned performance tests (see the comparative Examples).

Several patents and scientific publications dealing with fluorinated polymers from (per)fluoropolyethers to give oleo- and hydro-repellence to various substrata are known in the prior art, but very few concern the paper treatment. EP 273,449 describes aqueous dispersions of polyurethanes from (per)fluoropolyethers for textile spreadings. The Examples of this patent show that these dispersions give to the substratum a water repellence, but not oleo-repellence. In this patent no mention is made to the use of said polyurethanes for the paper sizing.

EP 533,159 describes ionomeric polyurethanes from (per) fluoropolyethers containing diamines, for applications as consolidating agents for stony or fibrous articles. Tests carried out by the Applicant have shown that these dispersions are unsuitable for giving to the paper sized acceptable oleo-repellence from the industrial point of view.

EP 689,908 describes aqueous dispersions of ionomeric polyurethanes from (per)fluoropolyethers used for the protection of wood, stones and cement from atmospheric and polluting agents. The application as oleo-repellent treatment for the paper is not described. From the Examples the compounds having a higher protective efficacy for wood result to be cationic polyurethanes. Patent application EP 1,059,319 describes cationic polyurethanes from (per)fluoropolyethers having a branched structure and selfcrosslinking. Tests carried out by the Applicant have shown that cationic polyurethanes are unsuitable for the paper sizing, since they give a poor oleo-repellence (they do not pass the above tests).

U.S. Pat. No. 6,224,782 describes polyurethanes containing perfluoroalkyl oligomers and hydrophilic segments based on ethylene oxide units, capable to give to the substratum, in particular textile substratum antistain properties. Said polyurethanes require the presence of significant amounts of surfactants and stirrer which require high shear to be dispersed in water. The high surfactant content can give rise to release and migration phenomena of these compounds when the paper sized with the dispersions of said polyurethanes comes into contact with fat substances. Therefore the polyurethanes of this patent show contraindications when utilized to treat the paper for food use. Besides in U.S. Pat. No. 6,224,782 specific examples of oleo-repellent paper sizing are not described. The use of high shear stirrers to prepare the aqueous dispersions has the drawback to limit the industrial productivity of these polyurethanes.

Furthermore in the industrial application it is preferable that the treatment confers to the paper, in addition to the oil and water resistance, also antiadhesivity properties which favour the release of the semifinished paper sheets in web, allowing to minimize the discarded articles. No fluorinated compound described in the prior art, used as paper additive, mentions said release properties.

The need was felt to have available fluorinated compounds having the following combination of properties:
to pass the most severe performance tests above indicated for oleo-repellence,
good hydro-repellence,
good release effect on the paper sized sheets,
application from aqueous phase to avoid the use of solvents, especially those flammable.

SUMMARY OF THE INVENTION

The Applicant has surprisingly and unexpectedly found aqueous dispersions of anionic polyurethanes from (per)fluoropolyethers which satisfy the above technical problem, even though in said polymers —$CF_3$— ended perfluoroalkyl groups are not present. The Applicant has furthermore unexpectedly found that the polyurethanes from (per)fluoropolyethers in the above mentioned performance tests give improved results with respect to the commercial products, notwithsatanding having on average, lower Kit Test values.

DETAILED DESCRIPTION OF THE INVENTION

An object of the present invention is the use for the paper sizing of aqueous dispersions containing polyurethanes from (per)fluoropolyethers obtainable by reaction of the following components:
a) (per)fluoropolyether diols having a number average molecular weight from 400 to 5,000, preferably from 800 to 2,500;
b) diisocyanates having formula:

OCN—R—NCO      (VIa)

wherein R has the following meanings:
$C_2$-$C_{12}$ aliphatic bifunctional radical;
$C_6$-$C_{18}$ cycloaliphatic or alkylen-cycloaliphatic, wherein optionally the cycloaliphatic ring can be substituted with one or more $C_1$-$C_3$ alkyl groups, or R contains two cycloaliphatic rings, each having a —NCO group, linked by a $C_1$-$C_6$ alkylene chain;
$C_6$-$C_{18}$ aromatic bifunctional radical, wherein the aromatic ring can be substituted with one or more $C_1$-$C_3$ alkyl groups, or
R contains two aromatic rings, each having a —NCO group, linked by a $C_1$-$C_6$ alkylene chain;
preferably diisocyanates b) being selected from the following: hexamethylendiisocyanate (HDI), trimethyl-hexamethylendiisocyanate, isophoron diisocyanate (IPDI), 4,4'-methylenbis(cyclohexylisocyanate) (H12-MDI), cyclohexyl-1,4-diisocyanate, 4,4'-methylenebis (phenylisocyanate) (MDI) or its isomers, toluene 2,4-diisocyanate (TDI) or its isomers, xylylene diisocyanate, naphthalene-1,5-diisocyanate, p-phenylen-diisocyanate;
c) anionomeric diols, compounds containing two hydroxylic functions and one carboxylic, containing from 4 to 10 carbon atoms, preferably from 4 to 8 carbon atoms, the alkyl chain being optionally branched; preferably c) is the dimethylolpropionic acid

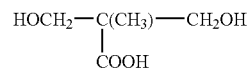

and optionally one or both the following components:
d) hydrazine and/or aliphatic diamines with chain from 2 to 6 carbon atoms, such ethylendiamine, hexamethylendiamine;
e) monofunctional hydroxylic (per)fluoropolyethers having a number average molecular weight in the range 300-1,000, preferably 400 and 800, wherein first a) is reacted with b), and in a second step the reaction product is reacted with component c), then optionally in a third step with d) and/or e), using an amount of a) such that the polyurethane be formed by a percentage from 50 to 90% by component a), the sum of the hydroxylic groups of a)+c), and optionally e) and/or the amino groups of component d), being equal to the sum of the —NCO groups of b), the synthesis process being completed by the polyurethane salification with bases and subsequent dispersion in water.

The bifunctional (per)fluoropolyethers indicated in a) have one or more of the following units statistically distributed along the chain: ($C_3F_6O$); (CFYO) wherein Y is F or $CF_3$; ($C_2F_4O$); ($CF_2(CF_2)_{x'}CF_2O$) wherein x' is an integer equal to 1 or 2; ($CR_4R_5CF_2CF_2O$) wherein $R_4$ and $R_5$ are equal to or different from each other and selected from H, Cl, and wherein one fluorine atom of the perfluoromethylene unit can optionally be substituted with H, Cl or (per)fluoroalkyl, having for example from 1 to 4 carbon atoms.

The preferred bifunctional compounds of a) are the following with the perfluorooxyalkylkene units statistically distributed along the chain:

(a') —$CF_2$—O—($CF_2CF_2O$)$_{p'}$($CF_2O$)$_{q'}$—$CF_2$—      (VIII)

wherein:
p' and q' are numbers such that the q'/p' ratio is comprised between 0.2 and 2 and the number average molecular weight is in the above range for the (per)fluoropolyether diols a);

(b') —CFY—O—($CF_2CF(CF_3)O$)$_{r'}$—($CF_2CF_2O$)$_{s'}$— (CFYO)$_{t'}$—CFY—      (IX)

wherein:
Y is as above defined; r', s' and t' are numbers such that r'+s' is comprised between 1 and 50, the ratio t'/(r'+s') is between 0.01 and 0.05, r'+s' being different from zero, and the molecular weight is in the above indicated range for the (per)fluoropolyether diols a);

(c') —CF(CF$_3$)(OCFY)$_{r'}$(OC$_3$F$_6$)$_{u'}$—OR'$_f$O—(C$_3$F$_6$O)$_{u'}$(CFYO)$_{r'}$CF(CF$_3$)—     formula (X)

wherein:
R'$_f$ is a C$_1$-C$_8$ perfluoroalkylene; u'+t' is a number such that the number average molecular weight is in the above indicated range for the (per)fluoropolyethers diols a);
t' can also have the value of zero; Y is as above;

(d') —CF$_2$CF$_2$O—(CF$_2$(CF$_2$)$_{x'}$CF$_2$O)$_{v'}$—CF$_2$CF$_2$—     (XI)

wherein:
v' is a number such that the molecular weight is in the above indicated range for the (per)fluoropolyether diols a), x' is an integer equal to 1 or 2;

(e') —CF$_2$CH$_2$—(OCF$_2$CF$_2$CH$_2$)$_{w'}$—OR'$_f$O—(CH$_2$CF$_2$CF$_2$O)$_{w'}$—CH$_2$CF$_2$—     (XII)

wherein:
R'$_f$ is as above; w' is a number such that the number average molecular weight is in the above indicated range for the (per)fluoropolyether diols a);

the end groups of the bifunctional perfluoropolyethers component a) being of the type —CH$_2$—(OCH$_2$CH$_2$)$_{k'}$—OH, wherein k' is a number comprised between 0 and 5, preferably between 0 and 2.

The bifunctional (per)fluoropolyoxyalkylenes can be prepared starting from the corresponding (per)fluoropolyoxyalkylenes having —COF end groups (see for example patents GB 1,104,482, U.S. Pat. No. 3,715,378, U.S. Pat. No. 3,242,218, U.S. Pat. No. 4,647,413, EP 148,482, U.S. Pat. No. 4,523,039, EP 340,740, patent application WO 90/03357, U.S. Pat. No. 3,810,874, EP 239,123, U.S. Pat. No. 5,149,842, U.S. Pat. No. 5,258,110).

The hydroxylic monofunctional (per)fluoropolyethers component e) comprise one or more (per)fluorooxyalkylene units as defined for component a) PFPE diol. Preferred compounds of e) are the following, wherein the units are statistically distributed along the chain:

IB) A'O(C$_3$F$_6$O)$_m$(CFYO)$_n$— wherein Y is —F, —CF$_3$; A'=—CF$_3$, —C$_2$F$_5$, —C$_3$F$_7$, —CF$_2$Cl, CF$_3$CF(CF$_2$Cl)—;
the C$_3$F$_6$O and CFYO units are randomly distributed along the (per)fluoropolyether chain, m and n are integers, the m/n ratio is ≧2, they are obtainable by photooxidation of hexafluoropropene according to the process described in patent GB 1,104,482;

IIB) C$_3$F$_7$O(C$_3$F$_6$O)$_m$— wherein m is a positive integer, wherein the average number molecular weight is that indicated above for component e), obtainable by ionic telomerization of hexafluoropropene epoxide: see for example U.S. Pat. No. 3,242,218;

IIIB) A'O(C$_3$F$_6$O)$_m$(C$_2$F$_4$O)$_n$(CFYO)$_q$ wherein Y and A' are as defined in IB); m, n and q, different from zero, are integers such that the number average molecular weight is that indicated for component e); obtainable by photooxidation of mixtures of C$_3$F$_6$ and C$_2$F$_4$ by the processes described in U.S. Pat. No. 3,665,041;

the end group being of the type HO(CH$_2$CH$_2$O)$_{x0}$CH$_2$— wherein x0 is an integer between 0 and 5, preferably between 0 and 2.

In the salification step amines, preferably tertiary or inorganic bases of alkaline metals can be used as bases.

The process for poreparing the polyurethanes used in the present invention is carried out as follows. It generally comprises the following steps:

I. Prepolymerization by reacting the PFPE diol a) and the diisocyanate b) at temperature of 50°-90° C., under mechanical stirring, preferably in dipolar aprotic solvents such MEK or NMP (N-methylpyrrolidone) at a dry concentration from 70 to 90%, under inert atmosphere and in the presence of catalysts such tertiary amines (triethylamine) or Sn salts in amounts from 0.005 to 0.03% by weight based on the diisocyanate. The reaction is continued until reaching the theoretic —NCO titre, determined by titration (ASTM D2572).

II. Chain extension of the prepolymer obtained in step I. by reacting at a temperature from 60° to 70° C. adding the ionomeric hydrogenated diol c) under stirring, for 4 h to 10 h, the dry content being from 60 to 75%, until disappearance of the —NCO band at 2260 cm$^{-1}$ in the IR spectrum.

III. Salification of the polyurethane with bases, preferably tertiary amines and discharge of the compound in a vessel containing H$_2$O, equipped with mechanical stirring, to obtain the polymer dispersion in water, and subsequent optional solvent distillation at a temperature from 40° to 60° C. and under reduced pressure.

Alternatively, the prepolymer obtained in step I. can partially be reacted with the ionomeric diol c) so that at the end a residual amount of —NCO groups is still present, so as to obtain an ionomeric prepolymer. Said ionomeric prepolymer can be discharged in H$_2$O as described in III. and the polymerization is ended through the addition in H$_2$O of the optional component d) (hydrosoluble diamines) until disappearance of the —NCO band at 2260 cm$^{-1}$ in the IR spectrum.

Alternatively, it is possible to react the prepolymer obtained in the above step I. with an amount of the aliphatic diol component c) lower than the stoichiometric value and subsequently to add, to the reaction mixture, the hydroxylic monofunctional (per)fluoropolyether e) in amount sufficient to react with the remaining —NCO groups, continuing the reaction until the —NCO band disappearance, as indicated above. Step III. of salification and dilution in water is then carried out.

The so obtained final compound appears under the form of aqueous dispersion characterized by a dry residue ranging from 20 to 40%, substantially free from flammable organic solvents, viscosity <500 mPa·s and pH from 6 to 9 depending on the amount of component c) and of the base equivalents used to neutralize the polyurethane carboxylic groups. The molar ratio base/carboxyl group is in the range 0.1-1.5, preferably 0.3-1.

A further object of the invention are paper sheets with the combination of properties as above indicated, obtained by paper sizing with the invention (per)fluoropolyether polyurethanes, preferably in the form of the corresponding aqueous dispersions.

The fluorinated polyurethane of the present invention can be used for the paper sizing by using the application methods known in the prior art. For example it can be "wet-end" applied according to the use considered in the present invention: wet-end application or application in the pulp slurry. Another method is the surface treatment of the already formed paper sheet: applications by size-press and/ or coating, respectively. The wet-end treatment is preferred since it generally gives the best hydro- and oleo-repellence properties.

For said applications, paper, cardboard, etc. are treated with the dispersions of the fluorinated polyurethanes in a suitable medium (water, or water and solvent mixture).

In the wet-end application the polyurethane is added to the cellulose fiber slurry before the paper sheet formation, in an amount ranging from 0.2% to 2% by weight with respect to the dry content of the slurry. The dry cellulose concentration in the slurry at the time of the compound addition ranges from 0.1% to 10% by weight. The slurry can be formed or by virgin soft wood and/or hard wood obtained by Kraft or sulphite process, or by recycled cellulose slurry or also by admixtures of said two kinds of slurries. The pulp-slurry can contain the additives normally used in the paper industry, for example organic or inorganic fillers, such as talc, kaolin, calcium carbonate or titanium dioxide; supporting agents used in the paper production, as starches, dextrins, retention agents, flocculating agents, buffer systems, fungicides, biocides, sequestrants, glue agents as ASA (succinic alkenyl anhydride) or AKD (alkyl ketene dimer). The cellulose suspension can have both acid and basic pH, preferably basic.

To improve the polyurethane retention on the cellulose fibers, it is preferable to add to the pulp slurry a fixative agent, before adding the polyurethane. Said fixative agent is generally a cationic compound, generally of polymer nature, having a molecular weight ranging from 10,000 to 5,000,000, in an amount ranging from 0.01% to 0.1% by weight of cationic compound based on the dry cellulose. The fixative agents are for example the following: cationic polyacrylamides, polyamines, copolymers polyamidoamine-epichlorohydrin or dimethylamine-epichlorohydrin, polyethylenimines, poly-diallyl-dimethyl-ammonium chloride.

To the pulp-slurry chelants can be added to moderate the water hardness.

After addition of the compound to the cellulose suspension, the water is removed and the wet paper can be dried at temperatures ranging from 90° C. to 130° C., according to the standard procedures used in the paper industry.

It has been found that the fluorinated polyurethane wet-end added distributes itself on the finished compound (paper) homogeneously in the paper. This is particularly important when the paper has to maintain the hydro- and oleorepellence properties even when it has been bent or has undergone surface incisions. In fact said properties are maintained even subjecting the paper to abrasion and hot calendering processes, often used after the paper formation and drying, to improve the gloss.

In the case of the surface application of the fluorinated polyurethanes of the invention to the preformed paper sheet, the compounds can be applied by spreading or by dipping an aqueous polyurethane dispersion. In the coating case, the paper sheet is treated only on one surface; in the size-press treatment, the treatment is performed on both sides of the sheet.

In a typical application by coating, the fluorinated polyurethane is added in an amount ranging from 0.2 to 2% by weight with respect to the used coating suspension. Said suspension can contain mineral fillers such for example calcium carbonate, kaolin, titanium dioxides and binders for pigments based on styrene-butadiene copolymers, acrylic copolymers or copolymers containing vinyl acetate.

In a typical application by paper sizing in size-press the polyurethane is added in aqueous suspension in an amount such that an amount from 0.2 to 2% by weight of polyurethane be deposited on the paper, said suspension being fed at temperatures from 20° C. to 90° C. among the cylinders of the size-press equipment. The hydro- and oleorepellence performances of the pulp-slurry result improved when supporting agents such as starches, as such or functionalized, polyvinyl alcohols, carboxymethylcellulose, melamine resins, ureaformaldehyde resins, compounds containing aldehyde groups, acrylic resins, styrene-butadiene copolymers, are added to the suspension.

Drying, both in the coating machine and in the size-press treatment, can take place at temperatures ranging from 90° C. to 130° C. according to the usual techniques used in the paper industry.

As said, the fluorinated polyurethane dispersions according to the present invention confer to the paper sized improved hydro- and oleo-repellence properties combined with the release property.

The following Examples illustrate the invention but do not limit the scope thereof.

EXAMPLES

Oleo- and Hydro-Repellence Tests.

The oleo- and hydro-repellence performances of the paper sized with fluorinated additives are evaluated by the following tests:

Kit Test

It is a test to evaluate the oleorepellence (TAPPI 557 method).

The Kit Test requires the preparation of the solutions indicated in Table 1.

TABLE 1

| Solution No. | Castor oil % vol. | Toluene % vol. | n-Heptane % vol. |
|---|---|---|---|
| 1 | 100 | 0 | 0 |
| 2 | 90 | 5 | 5 |
| 3 | 80 | 10 | 10 |
| 4 | 70 | 15 | 15 |
| 5 | 60 | 20 | 20 |
| 6 | 50 | 25 | 25 |
| 7 | 40 | 30 | 30 |
| 8 | 30 | 35 | 35 |
| 9 | 20 | 40 | 40 |
| 10 | 10 | 45 | 45 |
| 11 | 0 | 50 | 50 |
| 12 | 0 | 45 | 55 |
| 13 | 0 | 35 | 65 |
| 14 | 0 | 25 | 75 |
| 15 | 0 | 15 | 85 |
| 16 | 0 | 0 | 100 |

A specimen of sized paper is placed on a flat and clean black-coloured surface. One starts from the solution No. 16. One drop of the test solution is let fall on the paper from an Height of 25 mm. The drop is left in contact with the paper for 15 seconds, removing it then by clean blotting paper and the surface under the drop is examined. When the surface has become dark the specimen does not pass the test. The test is repeated with the solution No. 15. When the tested specimen does not pass the test, one proceeds using the solution No. 14, and the others in decreasing number order, until the solution is found with which the specimen passes the Kit Test. The number of said solution is the Kit Test value assigned to the paper.

The Kit Test is widely used for the immediate evaluation of the oleorepellence properties of papers sized with fluorinated compounds, since it is able to give in very short times (about 20 seconds) an evaluation of the paper antigrease properties. However not always the evaluations supplied by this test are reliable. For example papers sized having a high Kit Test value can show under particular conditions a poor barrier power towards some fats, for example at temperatures higher than the room temperature or with particularly aggressive fat mixtures. The reason is based on the fact that the Kit Test solutions discriminate the various levels of antigrease treatment, and therefore assign the respective Kit Test values essentially in function of the surface tension, which ranges from about 34.5 dynes/cm of the solution No. 1 to the 22 dynes/cm of the solution No. 12, to 20.3 dynes/cm of the solution No. 16. To do this, mixtures of castor oil, toluene and heptane are used as above described, compounds which are never present in any grease with which the paper sized with fluorinated compounds is commonly in contact. Furthermore fats of animal or vegetable nature generally have surface tensions not lower than 25 dynes/cm, value which corresponds to a Kit test value comprised between 6 and 7. Therefore Kit Test values higher than 7, taking into account the aforesaid surface tension properties of fats and oils are not realistic.

For said reason the following performance tests are used, which simulate more realistic use conditions as regards the type of fat agent, the contact time and the utilization temperature of the antigrease paper.

Ralston Crease Test

The reactants and the instruments necessary for this test are available c/o Ralston Purina® Company.

The Ralston Crease Test (RP-2 test) is commonly used to evaluate the resistance properties to the oil penetration in antigrease papers for pet-food packaging. The specimen to be tested is conditioned for 24 hours at 23° C. and 50±2% of relative humidity. One piece having 10×10 cm sizes is cut out. The cutting is positioned on a flat, smooth and stiff surface, placed above a coated paper sheet having printed a grid containing 100 small squares, having a surface exactly equal to that of the specimen to be tested. Before being positioned on the grid, the specimen is slightly creased along a diagonal. The crease is then reinforced with a suitable roll having a weight of 2040±45 g, diameter of 9.5 cm and width of 4.5 cm, covered by a rubber layer, of controlled hardness having a thickness of 0.6 cm. The roll speed during the creasing must be of 2-3 cm/sec. The specimen is to be creased along both the diagonals, the second crese is made by creasing the paper on the opposite side. The specimen with the creases is transferred on the grid so that it perfectly covers the grid surface. A metal ring having a diameter of 7.5 cm is put on the paper specimen to be tested. A metal pipe (height 2.5 cm, internal diameter 2.5 cm) is placed in the middle of the specimen, then 5 g of sand (Ottawa sand, 20-30 mesh) are poured into the pipe. The pipe is then removed, so as to form a sand cone in the middle of the specimen. Then 1.3 cc of a specific synthetic oil supplied by Ralston-Purina®, which contains 0.1% by weight of a red dye are then added to the sand cone by a syringe. Usually for the test at least 4 specimens of the same paper sample are prepared. The specimens with the sand are then kept in a stove at 60° C. and 50±2% of relative humidity for 24 h.

At the end the paper specimens with the sand are removed and the surface of the underlying grid stained by the coloured oil is evaluated. Each stained small square represents a fraction of the specimen surface equal to 1%. The finale value is the average of the results obtained on at least 4 specimens of the same sample. The Ralston Crease Test (RP-2 test) result is then expressed as number of stained small squares, which expresses also the % of stained squares of the grid. The sample acceptability limit is 2% of stained surface of the grid.

Pet Food Test

The Pet food test, also said of crisps test, evaluates the resistance of the paper sized to the direct contact with the crisps used for dog and cat food, which contain various fats of animal origin, and an amount of water generally not lower than 10% by weight.

The combined action of fats, and in this case also of water, together with the mechanical action determined by the combination of the crisp weight and by their shape characterized by pronounced edges, acts so that the test is passed when the paper specimen has a high resistance both to fats and to water. The conditions of this test are more severe than the Ralston Crease Test for the presence of an environment having a high relative humidity and of a weight which is applied as described hereinunder. Analogously to what made in the Ralston Crease Test, the specimen to be tested is conditioned for 24 hours at 23° C. and 50±2% of relative humidity. From the paper a specimen having 10×10 cm sizes is then cut out. The specimen is positioned on a flat, smooth and stiff surface, above a coated paper sheet having printed a grid containing 100 small squares, having exactly the same surface of the specimen to be tested. On the paper specimen a hollow metal parallelepiped is put, lacking of two opposite faces, with the base having 10×10 cm sizes. The hollow volume is filled with 250 cc of commercial crisps, and then a 7 kg weight is placed above the crisps. It is transferred in a stove at 70° C. and 65% of relative humidity for 24 h. At the end of the test, the specimen and the crisps are removed, and the surface of the squared paper underlying the specimen is examined. The test result is expressed in percentage of the stained surface with respect to that of the grid. The specimen passes the test if the stained surface results lower than 5% of the grid surface. The specimen of the paper sized which passes this test has a high resistance both to fats and to water.

Resistance Test to Olive Oil

The resistance test to olive oil is carried out on a paper specimen having 10×10 cm sizes. The specimen edges must be bent to prevent the oil from coming out. The specimen is put on a Petri capsule over a squared coated paper having the same properties of that used in the previous tests. 5 ml of olive oil are placed on the paper to be tested and this is transferred in a forced ventilation stove at 105° C. for 24 hours.

The test is passed when the grid is not stained (% of stained surface=0).

Resistance Test to Butter

Since the butter is an emulsion made by about 80% by weight of fats in about 20% by weight of water, this test supplies a reliable indication of high oleo- and hydro-repellent properties in the tested specimen. In this test a paper specimen having 5×5 cm sizes is put into contact with 1 g of butter, and then put in a stove at 70° for 30 minutes. This time elapsed, the paper is visually examined to verify the possible penetration of melted fat. The test result is positive when there is no penetration.

Evaluation of the Hydro-Repellence: Cobb Test (TAPPI T 441 Method)

The method is based on the weight increase of a paper specimen following the water absorption under standard conditions. The equipment to carry out the test consists in a support having a smooth, flat and stiff surface, combined with a hollow metal cylinder, having an internal diameter equal to 112.8±0.2 mm and height equal to 5 cm. A circular specimen having an area equal to that of the hollow cylinder base, which is of 100 cm$^2$, is cut out from the paper to be tested. The hollow cylinder is equipped with a locking device to perfectly adhere to the flat surface. The specimen to be tested is conditioned for 24 hours at 23° C. and 50±2% of relative humidity. The test is carried out in environment conditioned at the temperature of 23° C. Before the test, the paper specimen weight is recorded, then the specimen is placed on the flat surface, with the side to be evaluated turned upward, the cylinder is put in the centre of the specimen and the fastener device is locked so as to assure the perfect water seal. 100 ml of distilled water are quickly poured into the cylinder, obtaining a head of 1 cm of water and one waits for the necessary time for the test, according to the indications shown in the second column of Table 2 shown hereunder.

The test is carried out on at least 10 specimens of the paper sized to be tested.

The water contained in the cylinder is finally removed, the fastener device is quickly loosened, the specimen of wet paper sized is extracted and transferred, taking care of keeping the wet side turned upward, on a blotting paper sheet, with settled capillary ascension properties (TAPPI T 441 method). At the end of the total time established for the test, see Table 2, third column, a second blotting sheet is put on the paper specimen and a metal roll having a weight of 10 kg, is let slide thereon once forward and once back. The specimen is then weighed. The water absorption is expressed as g of absorbed water/m$^2$ of paper. The absorbed water grams are calculated by the difference of weight of the specimen before and after the test. The final value for the water absorption is calculated by the average values of the results achieved on at least 10 specimens obtained from the same sample. The lower the Cobb test, the higher the water resistance of the specimen.

TABLE 2

| Type of Cobb Test | Contact time of the 1 cm water head (sec) | Total time of the test (sec) |
|---|---|---|
| Cobb$_{30}$ | 20 | 30 |
| Cobb$_{60}$ | 45 | 60 |
| Cobb$_{120}$ | 85 | 120 |
| Cobb$_{300}$ | 105 | 300 |

Evaluation of the Release Property of a Paper Support

Test I

The evaluation of the release properties of a paper support is carried out by cutting out 10 squares having 10×10 cm sizes of the paper to be tested. The specimens are piled the one on the other on a stove plane, each with the treated side turned upward. Then a metal square having the same sizes is put thereon. It exactly adheres to the specimen surface, and a weight is placed thereon so that the total weight applied on the pile of the paper specimens is of 3 kg. The stove is maintained for 15 minutes at 50±1° C. and 50±2% of relative humididy. At the end the weights are removed. The test is passed when the paper specimens are removable the one from the other.

Test II

This test allows to quantitatively determine the release effect.

An adhesive label having 1×5 cm sizes is applied on the paper specimen, on which an uniform pressure is exerted, for a time of 5 minutes, by an aluminum weight equal to 70 grams. Said time elapsed, the weight is removed and the necessary force to remove the adhesive label from the paper specimen is measured by a dynamometer. For each specimen three measurements are carried out. The measured force is expressed in grams and the value shown in the Tables represents the average value of the three tests.

Determination of the Dry Residue

The dry residue is determined after evaporation of a dispersion amount from about 0.5 to about 1 g of dispersion at the temperature of 110° C. for 1 h.

Determination of the Absolute Viscosity

The Brookfield viscosity has been determined by DV-II+ instrument at the temperatures indicated in the Examples.

Example 1

Synthesis and characterization of an anionic polyurethane obtained starting from a (per)fluoropolyether diol having number average molecular weight 1,500.

Into a 10 liter reactor, equipped with mechanical stirrer, reflux condenser, thermometer and charging hopper 850 g of isophorondiisocyanate (IPDI), 937 g of methylethylketone (MEK), 2,900 g of (per)fluoropolyether diol (ZDOL), having number average molecular weight Mn 1,500 and the following structure:

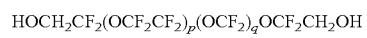

wherein p/q=2, are transferred.

The mixture is heated up to 50° C. under stirring, then 0.420 g of dibutyltin dilaurate (DBTDL) are added and it is heated up to 65° C. for 120 minutes. At the end on a sample of the reaction mixture the residual —NCO groups are titrated (ASTM D2572), which result 3,4% with respect to those initially present.

The mixture is diluted with 251 g of MEK and 270 g of dimethylolpropionic acid (DMPA), which is solubilized in the reaction mixture by dropping 200 g of triethylamine (TEA), are added under strong stirring. Heating is continued at 65° C. for 6 hours. At the end of the heating the disappearance of the —NCO band at 2260 cm$^{-1}$ is checked by IR spectroscopy.

The polymer solution is then cooled to 40° C. and diluted with 825 g of isopropanol (IPA), and dropped in one hour in a second 30 liter reactor equipped with a Rashton type stirrer at 200 rpm and containing 12 liters of H$_2$O.

After the solvent distillation at the temperature of 50° C., and using a vacuum of 80-100 mbar (8.10$^3$-10$^4$ Pa), 16 Kg of dispersion are obtained, having a slightly opalescent appearance and having the following properties:

dry residue 25.5% viscosity at 20° C.=100 mPa·s pH=7.8

Example 2

Synthesis and characterization of an anionic polyurethane-urea obtained starting from a (per)fluoropolyether diol having number average molecular weight 1,500.

110.3 g of IPDI, 230 g of perfluoropolyether diol of Example 1, 14.1 g of dimethylolpropionic acid and 10.6 g of triethylamine are fed into a 500 ml flask under nitrogen.

The reaction is carried out at 50° C. for 45 minutes, and then the —NCO titre is determined according to ASTM D2572.

The —NCO-ended prepolymer is diluted with N-methyl pyrrolidone up to a dry content of 85% by weight and the suspension is fed in 30 minutes into a second reactor equipped with a Rashton type stirrer and containing 790 g of water at the temperature of 5° C. When the addition of the prepolymer dispersion is over, 10 g of ethylendiamine are slowly added until disappearance of the —NCO group (IR spectroscopy).

A polyurethane dispersion having a slighly opalescent appearance and having the following properties, is obtained:
Dry compound: 29.5%
pH: 7.8
Viscosity at 20° C.: 20 mPa·s

Example 3

Production of paper having oleo- and hydro-repellent properties by wet-end treatment of virgin fiber with the polyurethane of Example 1

A slurry of virgin fiber of eucalyptus, containing 70% by weight of soft wood and 30% by wheight of hard wood, is refined at 33° SR (Shopper degrees) and then treated with 0.3% by weight of cationic coagulant copolymer dimethylamine-epichlorohydrin, in a laboratory sheet forming machine. The bath pH is about 7.5. The polyurethane dispersion obtained in Example 1 is added to the slurry after dilution with water, so as to have a concentration of final dry compound of 1.0% by weight with respect to the dry fiber. The wet paper specimen is recovered and dried in press at 105° C. for 5 minutes. The basis weight of the obtained paper specimen is equal to 80 g/m². The oleo- and hydro-repellence properties of the specimen, evaluated by the above tests, are the following:

| | |
|---|---|
| Kit Test | 8 |
| Creased RP-2 Test (% stained surface) | 0 |
| Pet food test (% stained surface) | 5 |
| Resistance to olive oil (% stained surface) | 0 |
| Cobb$_{60}$ Test (g/m²) | 30 |

Above results show that the paper obtained by wet-end treatment has high oleo- and hydro-repellence properties.

Example 4

Production of paper having oleo- and hydro-repellent properties by wet-end treatment of a slurry formed for the most part by recycled cellulose, and for a lower amount by virgin fiber, with the polyurethane of Example 1.

A slurry having the following composition by weight: 75% recycled fiber, 15% eucalyptus hard wood and 10% eucalyptus soft wood, is treated with an amount equal to 0.4% by weight of the cationic coagulant used in Example 3, in a laboratory sheet forming machine. The polyurethane dispersion is added as in Example 3, so as to have the same final concentration of polyurethane with reapect to the dry fiber. The wet paper specimen is recovered and dried as in Example 3, obtaining a specimen having a basis weight equal to 90 g/m².

The oleo-repellence properties of the specimen, evaluated by the above tests, are the following:

| | |
|---|---|
| Kit Test | 8 |
| Creased RP-2 Test (% stained surface) | 0 |
| Resistance to olive oil (% stained surface) | 0 |

The test results show that even using recycled cellulose, but using the polyurethane of the present invention, paper sized can be obtained having good oleo-repellence properties.

Example 5

Production of calendered paper under severe conditions, having oleorepellent properties by wet-end treatment of virgin fiber with the polyurethane of Example 1.

A slurry having the following composition by weight: 50% of virgin fiber of the Softwood Kraft type and 50% of virgin fiber of the Softwood Sulphite type, is refined at 28° SR and treated with an amount equal to 0.2% by weight of the cationic coagulant of Example 3. The polyurethane dispersion of Example 1 is added so as to have a final amount of polyurethane equal to 0.7% by weight with respect to the dry fiber. After drying, carried out with hot air at 105° C., the paper is subjected to calendering by passage between two cylinders heated at 110° C., between which there is a pressure of 200 bar (20 MPa). The obtained paper has the following oleo-repellent properties:

| | |
|---|---|
| Kit Test | 7 |
| Creased RP-2 Test (% stained surface) | 0 |

These oleo-repellence values, compared with those obtained in Example 3, show that the paper obtained according to the process described in the present Example, maintains the oleo-repellence properties even after calendering treatments in drastic conditions.

Example 6

Production of paper having oleo- and hydro-repellent properties by treatment in size-press equipment of a paper support with the polyurethane of Example 1

A paper support having a basis weight of 65 g/m² is treated in size-press at room temperature. The pressure between the cylinders is of 3 bar (3.10⁵ Pa). An aqueous dispersion containing the polyurethane of Example 1 at 1% concentration by weight is used. After the treatment the paper is dried in press at 105° C. for 3 minutes. The obtained specimen has the following properties:

| | |
|---|---|
| Kit Test | 7 |
| Creased RP-2 Test (% stained surface) | 0 |
| Pet food test (% stained surface) | 2 |
| Resistance to olive oil (% stained surface) | 0 |

-continued

| | |
|---|---|
| Resistance to butter | positive |
| Cobb$_{60}$ Test (g/m$^2$) | 25 |

These results show that the paper obtained by treatment in size-press equipment has high oleo- and hydro-repellence properties.

Example 7

Production of paper having oleo- and hydro-repellent properties by treatment of a paper support with the polyurethane of Example 1 in the presence of process supporting agents in size-press equipment.

A paper support having a basis weight of 65 g/m$^2$ is treated in size-press at room temperature, with a pressure between the cylinders equal to 3 bar (3.10$^5$ Pa). An aqueous dispersion containing the polyurethane of Example 1 at 1% concentration by weight is used, containing the following additives for the treatment in size-press: ethylated starch 5% by weight and glyoxal 0.6% by weight. After the treatment the paper is dried in press at 105° C. for 3 minutes. The oleo- and hydro-repellence properties of the specimen, evaluated by the above tests, are the following:

| | |
|---|---|
| Kit Test | 8 |
| Creased RP-2 Test (% stained surface) | 0 |
| Pet food test (% stained surface) | 0 |
| Resistance to olive oil (% stained surface) | 0 |
| Cobb$_{60}$ Test (g/m$^2$) | 20 |

These results show that the paper obtained by treatment in size-press equipment, using in combination with the polyurethane process additives, maintains unchanged the oleo-repellence properties, but it improves the hydro-repellence properties. This means that the additives used in the size-press process are compatible with the polyurethane of the present invention.

Example 8

Production of paper having oleo- and hydro-repellent properties by treatment of a paper support with the polyurethane of Example 1 in the presence of process supporting agents (styrene-butadiene latex) in size-press equipment.

A paper support having a basis weight of 65 g/m$^2$ is treated in size-press at room temperature, with a pressure between the cylinders equal to 3 bar (3.10$^5$ Pa). An aqueous dispersion containing the polyurethane of Example 1 at 1% concentration by weight is used, containing as additive for the treatment in size-press a styrene-butadiene latex at 20% by weight. After the treatment the paper is dried in press at 105° C. for 3 minutes. The oleo-repellence properties of the specimen, evaluated by the above described tests, are the following:

| | |
|---|---|
| Kit Test | 8 |
| Creased RP-2 Test (% stained surface) | 0 |
| Pet food test (% stained surface) | 0 |
| Resistance to olive oil (% stained surface) | 0 |
| Cobb$_{60}$ Test (g/m$^2$) | 20 |

These results confirm those obtained in the previous Example 7.

Example 9

Surface cardboard treatment by coating with a formulation containing the polyurethane of Example 1

A specimen of coupled thin card, having basis weight of 280 g/m$^2$, is coated by a laboratory filmspreader with a formulation at 65% by weight of total dry compound having the following percent composition by weight: lamellar kaolin 41.2%, titanium dioxide 10%, styrene-butadiene latex 13% and 0.8% by weight of polyurethane of Example 1. The coat temperature during the application is 50° C., the thickness of the coated layer is of 1.2 mils (30 micron). The wet coated thin card is dried in a stove at 110° C. for 2 minutes. The obtained specimen has an oleo-repellence value, determined according to the Kit Test, of 6.

This Example shows that the polyurethane is compatible with the typical components of the formulations used in the coating processes.

Example 10

Preparation of paper with oleo-repellent and release properties by surface treatment with a thermosealing polymer added with the polyurethane of the present invention An aqueous formulation containing an amount of a thermo-sealing hydrogenated acrylic polymer (Crodacoate® 59-598, Croda) equal to 49% by weight is additived with 2% by weight, with respect to the weight of the dry acrylic polymer, of the polyurethane of Example 1. Then it is diluted with water until obtaining a dispersion at 25% by weight of total dry compound.

Paper specimens having a basis weight equal to 65 g/m$^2$ are coated with the above prepared dispersion using a laboratory filmspreader and then dried at 105° C. for 3 minutes. In this way on the paper about 5 g/m$^2$ of the dispersion dry compound are applied.

The properties of the coated paper sheets are the following:
evaluation of the release properties
   Test I: positive
   Test II: separation force: 0.7 g
Kit Test: 7

This Example shows that by using the polyurethane dispersions according to the present invention in the paper coating, release and oleorepellence properties are conferred to the sheet.

Example 10a (Comparative)

Example 10 is repeated without adding the polyurethane.
The properties of the so obtained coated paper sheets are the following:
evaluation of the release properties
   Test I: negative
   Test II: separation force: 160 g
Kit Test: 1

Example 10a shows that in absence of the polyurethane of the invention the paper sheets have no release properties.

Example 11 (Comparative)

Production of paper by wet-end treatment using the process and the same virgin fiber of Example 3 but substituting the polyurethane with a commercial compound.

In this Example instead of of the polyurethane the commercial compound AG530N® (Asahi Glass), formed by an aqueous disprsion of diethanolaminic salts of perfluoroalkylethyl-phosphates, is used. The compound is added so as to have in the slurry an amount equal to 1.0% by weight calculated on the dry fiber.

The oleo-repellence properties of the specimen, evaluated by the above tests, are the following:

| Kit Test | 12 |
| --- | --- |
| Creased RP-2 Test (% stained surface) | 70 |
| Pet food test (% stained surface) | >20 |

These results show that the paper obtained by wet-end treatment by using the commercial compound, in spite of the high oleo-repellence value obtained in the kit test, has really no high oleo-repellence properties as it is shown by the high values obtained both in the Creased RP-2 Test and in the Pet food test.

Example 12a

Production of paper having oleo- and hydro-repellent properties by treatment in size-press equipment of a paper support with the polyurethane of Example 1 but with a lower concentration than that used in Example 6.

The process of Example 6 is repeated but using an aqueous dispersion of polyurethane having a 0.4% by weight concentration. The obtained specimen has the following properties:

| Kit Test | 7 |
| --- | --- |
| Creased RP-2 Test (% stained surface) | 0 |

Example 12b (Comparative)

Production of paper having oleo- and hydro-repellent properties by treatment in size-press equipment of a paper support by using an aqueous dispersion of a commercial compound at a concentration by weight equal to that of the polyurethane of Example 12a.

The process of Example 12a is repeated but using an aqueous dispersion of the commercial compound AG530N® (Asahi Glass) having 0.4% concentration by weight. The obtained specimen has the following oleo-repellence properties:

| Kit Test | 12 |
| --- | --- |
| Creased RP-2 Test (% stained surface) | 20 |

Example 13a (Comparative)

Example 6 is repeated but using instead of the polyurethane dispersion, a dispersion at the same concentration on the dry compound of the compound AG530N® (Asahi Glass).

The results of the tests for the oleo- and hydro-repellence properties are shown in Table 3.

Example 13b (Comparative)

Example 6 is repeated but using instead of the polyurethane dispersion, a dispersion at the same concentration on the dry compound of the compound Lodyne® P-201 (Ciba) formed by a salt of a compound based on perfluoroalkyl, containing a thioether bond.

The results of the tests for the oleo- and hydro-repellence properties are shown in Table 3.

Example 13c (Comparative)

Example 6 is repeated but using instead of the polyurethane dispersion a dispersion, at the same concentration on the dry compound of the compound Scotchban® FC-807A (3M) formed by an ammonium salt of a compound perfluoroalkylphosphate type.

The results of the tests for the oleo- and hydro-repellence properties are shown in Table 3.

Example 13d (comparative)

Example 6 is repeated but using instead of the polyurethane dispersion, a dispersion at the same concentration on the dry compound of the compound Zonyl® 8868 (Du Pont) formed by an aqueous dispersion of a cationic acrylic copolymer containing perfluoroalkyl segments.

The results of the tests for the oleo- and hydro-repellence properties are shown in Table 3.

Example 13e (Comparative)

Comment on Table 3

The Table shows that only treating the paper with the dispersion of the anionic polyurethane of the invention it is possible to pass all the indicated oleo- and hydro-repellence tests.

The Table confirms that the value obtainable in the Kit test not always allows a reliable prvision of the oleo-repellence properties of the tested paper sized specimen.

Example 14 (Comparative)

Synthesis of a Cationic Polyurethane According to EP 689,908

1 Kg of perfluoropolyether diol having formula:

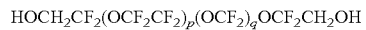

with p/q=2 and number average molecular weight 2,000, 22.23 g of IPDI and two drops of dibutyltin dilaurate solution are fed into a glass flask. The mixture is left under stirring and under nitrogen flow heating at 80° C. for 2 hours. At the end the prepolymer formation with —NCO end groups is checked by titration according to ASTM D2572.

100 g of N-methylpyrrolidone (NMP) containing 5.96 g of 3-dimethylamino-1,2-propandiol are added. The reaction mixture is maintained at 80° C. for 8 hours until disappearance of the —NCO band, as checked by IR spectroscopy (Example 1).

It is cooled to 60° C., acetic acid (3.0 g) and then distilled $H_2O$ are added under strong stirring until obtaining a polymer, slightly opalescent, dispersion having the following properties:

dry residue: 25%
viscosity (20°): 150 mPa·s
pH: 4.0

Example 15 (Comparative)

Production of paper having oleo- and hydro-repelleent properties by treatment in size-press equipment of a paper support with the polyurethane of Example 14, by using the process and the conditions of Example 6

The paper sized has the following oleo- and hydro-repellence properties:

| Kit Test | 5 |
| --- | --- |
| Creased RP-2 Test (% stained surface) | >20 |
| Pet food test (% stained surface) | >80 |
| $Cobb_{60}$ Test (g/m$^2$) | 20 |

The obtained data show that the paper obtained according to this Example, in spite of a higher hydro-repellence value ($Cobb_{60}$ test), has oleo-repellence properties, in all the tests carried out, evidently lower than those of the paper sized according to Example 6 of the present invention.

Example 16

Production of paper having oleo- and hydro-repellent properties by treatment in size-press equipment of a paper support with the polyurethane of Example 2, by using the process and the conditions of Example 6

The paper sized obtained according to this Example has the following oleo- and hydro-repellence properties:

| Kit Test | 6 |
| --- | --- |
| Creased RP-2 Test (% stained surface) | 0 |
| Pet food test (% stained surface) | 2 |
| $Cobb_{60}$ Test (g/m$^2$) | 17 |

The paper sized according to this Example shows the same values as regards the oleo-repellence properties (Crease RP-2 Test and Pet Food Test) and a higher hydro-repellence degree.

Example 17 (comparative)

Obtaining of an anionic polyurethane dispersion prepared according to EP 533,159, using in the synthesis the polytetramethylen glycol (PTMG)

Into a flask equipped with mechanical stirring, thermometer and reflux, 160 g of perfluoropolyether diol having the same composition as that of Example 1 but molecular weight 2,000, 53 g of IPDI and 63 g of PMA (propylen glycol-methylether acetate) are fed. The mixture is heated under nitrogen at 40° C., a drop of dibutyl tin dilaurate is added, and heating is continued at 75° C. for 4 ore, checking by NMR the complete conversion of the prepolymer (disappearance of the hydroxylic groups of the perfluoropolyether diol). It is cooled to 55° C., and 8.58 g of dimethylol propionic acid and 46.4 g of polytetramethylen glycol (PTMG) having molecular weight 2,900 are added.

The temperature is brought to 75° C., and heating is continued for further 8 hours, until the —NCO titre (determined according to ASTM D2572) results <2%. It is cooled to 35° C. and 6.46 g of triethylamine (TEA), 410 g of distilled $H_2O$ and lastly 12 g of isophorondiamine dissolved in 100 ml of $H_2O$ are added in sequence. The dispersion is left under stirring at room temperature for 30 minutes, checking at the IR spectroscopy the absence of absorption bands at 2260 cm$^{-1}$ (—NCO band).

A dispersion having an opalescent appearance, with the following properties is lastly obtained:

dry compound=31%, pH=8, viscosity at 20° C.=120 mPa·s.

Example 18 (Comparative)

Obtaining of an anionic polyurethane dispersion prepared according to EP 533,159, by using in the synthesis Jeffamina® EDR 418.

The procedure of the previous Example 17 is repeated until obtaining the —NCO-ended prepolymer. To the prepolymer dispersion, at the temperature of 55° C., 8.58 g of dimethylol propionic acid and 7.2 g of polypropylen glycol (PPG) having molecular weight 500, are added. The reaction mixture is heated to 75° C. until obtaining a —NCO titre (ASTM D2572) <2.5%. The dispersion is cooled and 6.4 g of TEA, 410 g of water and lastly 10 g of Jeffamina® EDR 418 (polyoxyethylene with —$NH_2$ end groups) dissolved in further 100 ml of $H_2O$, are fed. After 30 minutes of stirring in water, the disappearance of the —NCO band at the IR spectrum is checked. The dispersion, having a white-opalescent appearance, has the following properties:

dry compound=30%, pH=8.1

Example 19 (Comparative)

Production of paper having oleo- and hydro-repellent properties by treatment in size-press equipment of a paper support with the polyurethanes of Examples 18 and 19 by using the process and the conditions of Example 6

The paper sized has the following oleo- and hydro-repellence properties:

| | Examples | |
| --- | --- | --- |
| | 18 | 19 |
| Kit Test | 5 | 5 |
| Creased RP-2 Test (% stained surface) | >20 | >20 |
| Pet food test (% stained surface) | >80 | >80 |
| $Cobb_{60}$ Test (g/m$^2$) | 25 | 40 |

By comparing above results with those of Example 6 it is noticed that the paper sized with these polyurethanes shows unsatisfactory hydro- and oleo-repellence properties.

TABLE 3

Olec- and hydro-repellent properties of the paper obtained by treatment in size-press with an aqueous dispersion of the invention polyurethane and comparison with dispersions having the same dry content of commercial products

|  | Ex. 6 | Ex. 13a comp. AG530N ® | Ex. 13b comp. Lodyne ® | Ex. 13c comp. Scotchban ® | Ex. 13d comp. Zonyl ® |
|---|---|---|---|---|---|
| Kit test | 7 | 14 | 12 | 12 | 16 |
| Creased RP-2 test | 0 | 0 | 0 | 0 | 0 |
| Pet food test | 2 | >10 | >10 | >10 | >10 |
| Resistance to butter | positive | negative | negative | negative | positive |

The invention claimed is:

1. A method for paper sizing to confer resistance to oils, fats, and water, and anti-adhesive properties comprising surface application on a formed paper sheet of aqueous dispersions containing anionic polyurethanes from (per)fluoropolyethers consisting essentially of the following compounds:

a) (per)fluoropolyether diols having a number average molecular weight from 400 to 5,000;

b) diisocyanates having formula:

$$OCN—R—NCO \qquad (VIa)$$

wherein R has the following meanings:

$C_2$-$C_{12}$ aliphatic bifunctional radical;

$C_6$-$C_{18}$ cycloaliphatic or alkylen-cycloaliphatic, wherein optionally the cycloaliphatic ring can be substituted with one or more $C_1$-$C_3$ alkyl groups, or R contains two cycloaliphatic rings, each having a —NCO group, linked by a $C_1$-$C_6$ alkylene chain; and $C_6$-$C_{18}$ aromatic bifunctional radical, wherein the aromatic ring can be substituted with one or more $C_1$-$C_3$ alkyl groups, or R contains two aromatic rings, each having a —NCO group, linked by a $C_1$-$C_6$ alkylene chain; and c) anionomeric diols, compounds containing two hydroxylic functions and one carboxylic, containing from 4 to 10 carbon atoms, the alkyl chain being optionally branched and optionally one or both the following components:

d) hydrazine and/or aliphatic diamines with chain from 2 to 6 carbon atoms;

e) monofunctional hydroxylic (per)fluoropolyethers having a number average molecular weight in the range 300-1,000, wherein a) is reacted with b), in a second step the compound obtained in the first step is reacted with c), in a third step optionally with d) and/or with component e), using an amount of a) such that the polyurethane is formed by a percentage from 50 to 90% by component a), the sum of the hydroxylic groups of a)+c), and optionally e) and/or the amino groups of component d), being equal to the sum of the —NCO groups of b), salification of the polyurethane with bases and subsequent dispersion in water.

2. The method of claim 1, wherein the bifunctional (per)fluoropolyethers indicated in a) have one or more of the following units statistically distributed along the chain: ($C_3F_6O$); (CFYO) wherein Y is F or $CF_3$; ($C_2F_4O$); ($CF_2$($CF_2$)$_x$$CF_2O$) wherein x' is an integer equal to 1 or 2; ($CR_4R_5CF_2CF_2O$) wherein $R_4$ and $R_5$ are equal to or different from each other and selected from H, Cl, and wherein one fluorine atom of the perfluoromethylene unit can optionally be substituted with H, Cl or (per)fluoroalkyl from 1 to 4 carbon atoms.

3. The method of claim 2, wherein the bifunctional compounds of a) are the following with the perfluorooxyalkylkene units statistically distributed along the chain:

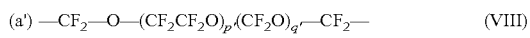

(a') —$CF_2$—O—($CF_2CF_2O$)$_{p'}$($CF_2O$)$_{q'}$—$CF_2$— (VIII)

wherein:

p' and q' are numbers such that the q'/p' ratio is comprised between 0.2 and 2 and the number average molecular weight is in the above range for (per)fluoropolyether diols a);

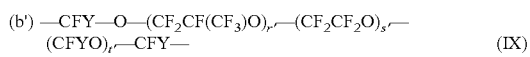

(b') —CFY—O—($CF_2CF(CF_3)O$)$_{r'}$—($CF_2CF_2O$)$_{s'}$—(CFYO)$_{t'}$—CFY— (IX)

wherein:

Y is as above defined; r', s' and t' are numbers such that r'+s' is between 1 and 50, the ratio t'/(r'+s') is between 0.01 and 0.05, r'+s' being different from zero, and the molecular weight is in the above range for the (per)fluoropolyether diols a);

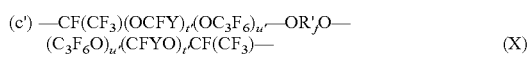

(c') —CF($CF_3$)(OCFY)$_{t'}$(OC$_3F_6$)$_{u'}$—OR'$_f$O—(C$_3F_6$O)$_{u'}$(CFYO)$_{t'}$CF($CF_3$)— (X)

wherein:

R'$_f$ is a $C_1$-$C_8$ perfluoroalkylene; u'+t' is a number wherein the number average molecular weight is in the above indicated range for the (per)fluoropolyether diols a); t' can also have the value of zero; Y is as above;

(d') —$CF_2CF_2O$—($CF_2(CF_2)_{x'}CF_2O$)$_{v'}$—$CF_2CF_2$— (XI)

wherein:

v' is a number wherein the molecular weight is in the above range for the (per)fluoropolyether diols a), x' is an integer equal to 1 or 2; and/or

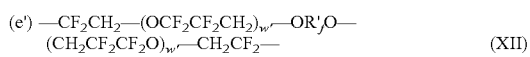

(e') —$CF_2CH_2$—(O$CF_2CF_2CH_2$)$_{w'}$—OR'$_f$O—(CH$_2CF_2CF_2$O)$_{w'}$—CH$_2CF_2$— (XII)

wherein:

R'$_f$ is as above; w' is a number wherein the number average molecular weight is in the above indicated range for the (per)fluoropolyether diols a);

the end groups of the bifunctional perfluoropolyethers component a) being of the type —$CH_2$—(OCH$_2$CH$_2$)$_{k'}$—OH, wherein k' is a number between 0 and 5.

4. The method of claim 3, wherein k' is a number between 0 and 2.

5. The method of claim 1, wherein the hydroxylic monofunctional (per)fluoropolyethers component e) comprise one or more (per)fluorooxyalkylene units as defined for component a) PFPE diol.

6. The method of claim 5, wherein component e) is selected from the following, wherein the units are statistically distributed along the chain:

$$A'O(C_3F_6O)_m(CFYO)_n— \quad \text{IB)}$$

wherein Y is —F, —CF$_3$; A'=—CF$_3$, —C$_2$F$_5$, —C$_3$F$_7$, —CF$_2$Cl, CF$_3$CF(CF$_2$Cl)—; the C$_3$F$_6$O and CFYO units being randomly distributed along the (per)fluoropolyether chain, m and n being integers, the m/n ratio $\geq 2$;

$$C_3F_7O(C_3F_6O)_m— \quad \text{IIB)}$$

wherein m is a positive integer, the average number molecular weight being that above indicated for component e);

$$A'O(C_3F_6O)_m(C_2F_4O)_n(CFYO)_q \quad \text{IIIB)}$$

wherein Y and A' are as defined in IB); m, n and q, different from zero, are integers such that the number average molecular weight is that indicated for component e);

the end group being of the type HO(CH$_2$CH$_2$O)$_{x0}$CH$_2$— wherein x0 is an integer between 0 and 5.

7. The method of claim 6, wherein x0 is an integer between 0 and 2.

8. The method of claim 1, wherein said polyurethane is added by size-pressing and/or by coating, on the formed paper sheet.

9. The method of claim 7, wherein the application for coating is carried out by using a suspension containing the polyurethane at a concentration from 0.2 to 2% by weight of polyurethane with respect to the suspension.

10. The method of claim 9, wherein the used suspension contains mineral fillers, binders based on styrene-butadiene copolymers, acrylic copolymers or copolymers containing vinyl acetate.

11. The method of claim 8, wherein the polyurethane is applied by size-pressing in aqueous suspension in amount such that an amount by weight from 0.2 to 2% of polyurethane is deposited on the paper.

12. The method of claim 11, wherein the used suspension comprises supporting agents selected from starches, optionally functionalized, polyvinyl alcohols, carboxymethylcellulose, melaminic resins, urea-formaldehyde resins, compounds containing aldehyde groups, acrylic resins, styrene-butadiene copolymers.

13. The method of claim 1, wherein said (per)fluoropolyether diols have a number average molecular weight from 800 to 2,500.

14. The method of claim 1, wherein said diisocyanates b) are selected from the group consisting of hexamethylendiisocyanate (HDI), trimethylhexamethylendiisocyanate, isophoron diisocyanate (IPDI), 4,4'-methylenbis(cyclohexylisocyanate) (H12-MDI), cyclohexyl-1,4-diisocyanate, 4,4'-methylenebis-(phenylisocyanate) (MDI) or its isomers, toluene 2,4-diisocyanate (TDI) or its isomers, xylylene diisocyanate, naphthalene-1,5-diisocyanate, and p-phenylen-diisocyanate.

15. The method of claim 1, wherein said anionomeric diols contain from 4 to 8 carbon atoms.

16. The method of claim 1, wherein said anionomeric diol is the dimethylolpropionic acid

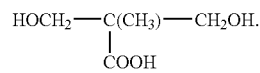

17. The method of claim 1, wherein said monofunctional hydroxylic (per)fluoropolyethers have a number average molecular weight in the range 400-800.

18. The method of claim 1, wherein the monofunctional hydroxylic (per)fluoropolyethers have a number average molecular weight in the range 400-800.

19. The method of claim 1, wherein the hydrazine and/or aliphatic diamines with chain from 2 to 6 carbon atoms is ethylendiamine or hexamethylendiamine.

20. Paper sheets obtained by paper sizing with (per) fluoropolyether polyurethanes according to claim 1.

* * * * *